Sept. 23, 1969    HANS-DIETRICH KRUG    3,468,991
PRODUCTION OF FOAMED ARTICLES
Filed July 18, 1966

INVENTOR
HANS-DIETRICH KRUG
BY
ATTORNEYS.

United States Patent Office 3,468,991
Patented Sept. 23, 1969

3,468,991
PRODUCTION OF FOAMED ARTICLES
Hans-Dietrich Krug, Heidelberg, Germany, assignor to Carl Freudenberg K.G., Weinheim an der Bergstrasse, Germany, a corporation of Germany
Filed July 18, 1966, Ser. No. 566,009
Int. Cl. B29d 27/00
U.S. Cl. 264—45                                                4 Claims

ABSTRACT OF THE DISCLOSURE

Process of producing a polyurethane foam article having a thick substantially non-foam skin surface integral with a substantially foam form core portion wherein the foam-forming material is placed in a mold which mold has the interior surfaces thereof coated with a polyurethane cross-linking agent, preferably an organo-tin-compound.

---

Figure 1:
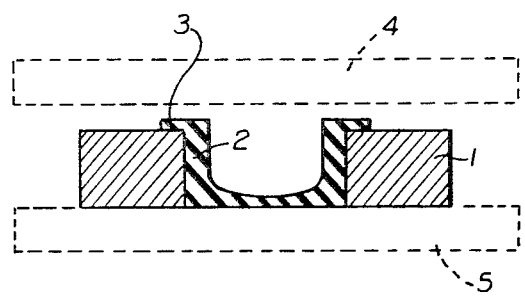

This invention relates to foamed articles. It more particularly refers to a process for the production of polyurethane foam articles having a protective coating thereon.

The manufacture of polyurethane materials is quite well known. These materials are the reaction and polymerization products of isocyanato- or isothiocyanato-containing compounds and compounds containing active hydrogen such as acids, alcohols, amides, etc. It is well known to utilize both aromatic and aliphatic diisocyanates and diisothiocyanates, such as for example tolylene diisocyanate or hexamethylene diisocyanates, in the production of these polymers. Suitable, known active hydrogen-containing compounds used to make polyurethanes are polyesters and polyethers, as exemplified by polyethylene adipate and polypropylene oxide, which polyester may be either carboxyl- or hydroxyl-terminated, as desired.

It is known to produce foamed articles comprising polyurethane by providing the polymerization reaction mixture with a blowing agent of some sort. It has been found to be quite desirable in many cases to provide foamed polyurethane articles with a protective layer which is relatively non-foam in structure.

Production of this type of article has in the past been accomplished in a two-step process. The foam article of desired shape and size has been produced and a suitable protective skin of appropriate size and shape has been produced. These two parts have then been joined by gluing or other suitable means to form the desired final article. It has also been proposed to produce a protective layer or skin in the form of a pouch and then to produce the polyurethane foam inside the pouch whereby the desired composite article is produced.

As can be seen, prior art methods have generally required two articles to be separately produced and then joined together to form the desired end product. It will be appreciated that this type of production is in need of improvement since it would be desirable to carry out the production of the desired articles discussed above by a less cumbersome process.

It is therefore an object of this invention to provide a novel process for the production of articles of polyurethane foam having a protective layer thereon.

It is another object of this invention to provide an article structurally consisting essentially of a polyurethane having a foamed interior and a substantially non-foam exterior.

It is a further object of this invention to provide a novel apparatus in which an article as described above can be produced.

Other and additional objects of this invention will become apparent from a consideration of this entire specification including the claims appended hereto.

In accord with fulfilling these objects, this invention includes as one of its aspects a shaped article structurally consisting essentially of a polyurethane and having an integral foamed interior and substantially non-foam exterior.

According to this invention, this article is produced by introducing a polyurethane foam-forming composition into a mold, which mold has interior walls which are substantially non-adherent with respect to the foam-forming composition as well as with respect to the final product; subjecting the contents of the mold to foam-forming conditions; and removing the desired product from the mold. It has been discovered, most surprisingly, that, when the mold walls are of a non-adherent material, the produced article has a substantially non-foam protective layer around the outside and is substantially foam on the inside. It has been found to be particularly useful to provide as the inside walls of the mold a silicone rubber, a halogenated polyolefin or an organo-tin compound. It is necessary in the practice of this invention that the non-adherent inside surface of the mold be continuous since it has been found that, where there are discontinuities in this surface, the protective layer is irregularly and incompletely formed, particularly because, in removing the finished article from the mold, some of the protective layer tends to remain attached to these discontinuities. Thus, the finished article does not have a complete protective layer.

It is preferred in the practice of this invention that the mold be charged with polyurethane foam producing material in such proportion that the total volume of foam which would be produced under atmospheric pressure conditions would be greater than the volume of the mold cavity. It is desirable that the foaming process produces an internal pressure in the mold such that the foam produced is forced against the mold walls. The most preferred internal pressure generated by the foaming is at least several atmospheres, suitably up to about 100 atmospheres or more may be provided, but care should be taken that the pressure generated is not so great that the foamed article is caused to adhere to the mold walls.

It is within the spirit and scope of this invention to utilize molds for forming polyurethane foams which have walls composed entirely of the above-referred to non-adherent composition. It may be practical to reinforce these walls to retain the internal pressure built up on the mold as is conventional practice. It is also within the scope of this invention to provide conventionally constructed metal (or other suitable material) molds of the desired size and shape and then to provide a suitable non-adherent coating on the inside walls of the mold.

The non-adherent inside mold walls have been stated to preferably consist of silicone rubber, fluorinated polyolefins or organo-tin compounds. Exemplary of the organo-tin compounds are tin ethylhexylate, tin isooctate, tin ricinoleate, tin naphthenate, di-n-butyl-tin-di-laurate. These tin compounds are suitably applied dissolving them in a suitable solvent, benzene for example, applying the solution to the inside wall of the mold and then evaporating the solvent. Such tin salts may be applied directly to metal mold surfaces. It is preferred, however, to provide an intermediate layer between the organo-tin compound and the metal mold wall. For example, silicone resins and polyester resins have been found to be suitable for use in this application.

It is within the spirit and scope of this invention to provide metal mold walls with a silicone rubber coating as suggested above, to use this material for preparing foam polyurethane articles according to this invention and then, after making several of such foam articles, to coat the silicone rubber with a suitable organo-tin compound, whereupon additional articles can be produced efficiently according to this invention. It has been found to improve efficiency if the organo-tin compound is periodically applied to the inside walls of the mold at some reasonable interval, for example, after every 50 to 100 moldings.

Silicone rubbers have been mentioned as suitable mold wall coatings. These are exemplified by "Giessmasse 56" sold by A. Wacker, Munich, Germany or mixtures thereof.

Fluorinated polyolefins have been mentioned as suitable mold wall coatings. These are exemplified by tetrafluoroethylene and polychlorotrifluoroethylene.

Suitable surface coatings according to this invention may be applied in layers up to any desired thickness. It has been found that coatings up to about 2 mils are generally satisfactory.

It is most desirable that, when using a silicone rubber or an organo-tin internal mold wall or coating, thereon, the polyurethane forming materials be substantially anhydrous. This is important since significant quantities of water may have a deleterious effect upon the mold walls, sometimes causing them to hydrolyze, or being responsible for local overheating and turbulent foam formation. By substantially anhydrous is meant that the water content is about 5 weight percent or below, preferably about 1.5 percent or below.

The polyurethane foam forming materials used in this invention are those generally used commercially or are otherwise conventionally known. The polymerization and foaming techniques are all conventional with the proviso that the internal pressure generation described above is provided.

The foaming is suitably carried out at about 100° C. over a period of about 5 to 10 minutes. After foaming is complete, it is preferred to permit the foam article to cool in the mold, and after such cooling to about 40 to 70° C. to remove such from the mold.

The following example is given by way of illustration of this invention without being limiting thereon.

EXAMPLES

Figure 2:
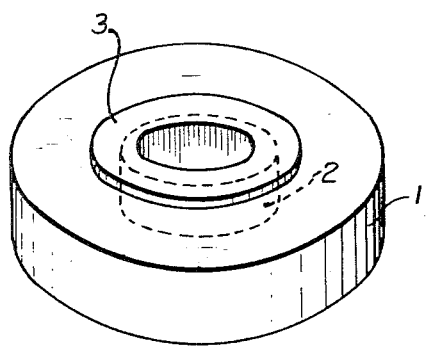

A foam-forming composition of about 60 parts of polyethylene adipate and about 40 parts of tolylene diisocyanate containing about 5 parts of a conventional piperazine derivative catalyst and as a blowing agent about 1% water is used as a charge. A mold as illustrated in FIGS. 1 and 2 is used. As there shown the mold comprises an outer support member as for instance the ring member of steel or the like 1 carrying an inner insert 2 of U-shaped cross section and providing the upper ring 3. The mold is substantially flexible and because of its flexibility readily removable from the support 1. The mold is preferably made of a non-adhering material or at least carries a contact surface (for the foam) of such material. In this example the mold itself was made of a cold-vulcanized silicone rubber and specifically one made by use of di-n-butyl-tin-laurate as a catalyst.

The cold-vulcanizable silicone product is for instance conventionally composed of dimethylpolysiloxane with conventional fillers and catalysts and suitable conventional filling and softening agents. Such material is for instance available on the market in Germany as "Giessmasse 56" by Wacker-Chemie G.m.b.H. in Munich, Germany.

The above described charge starts to react soon after the components are mixed together and is therefore filled into the insert 2 as quick as possible after co-mixing. The plates 4 and 5 are clamped together and the foam formation proceeds with a temperature raise.

The reaction proceeds rapidly. After cooling the plates 4 and 5 are removed and the mold insert 2 is easily removed from the support 1. The molded object is then easily removed from the flexible insert and the object upon examination is foamed to have a substantially non-foam protective layer on all surfaces of contact with the mold.

This protective layer is smooth, relatively compact and corresponds in every detail to the surface walls of the mold including any design ornamentation which the same may contain as for instance leather stitching or the like.

The surface layer is an integral part of the foam object and is produced by the surface action between the foamed material and the highly active cross-linking means produced by the tin component within the mold.

The same mold may be used several times. Since the cross-linking agent such as the two components above mentioned is thereby continuously removed from the surface of the mold material, the latter will develop a relatively hard surface no longer as efficiently usable for molding purpose as it was when new. It is therefore necessary to coat the surface of the mold insert with any suitable conventional highly active cross-linking agent for the foam material to be foam-molded in the mold insert. Within this specification suitable active cross-linking materials are a tin-ethylhexylate, tin-isooctate, tin ricinoleate, tin naphthenate, di-n-butyl-tin-di-laurate. The later gives particularly advantageous results. These tin compounds are applied by way of their easily sprayable solutions in benzene, the solution being sprayed at the inside of the mold insert and permitting the solvent to evaporate.

In alternative examples there were additionally added small amounts of paraffin, silicone oil and other conventional adhesion preventing agents. Best results are obtained by using about equal amounts of the adhesion preventing material, the cross-linking agent and the solvent except that in those cases where more viscose components and particularly of the cross-linking agent are used it is desirable to improve the sprayability of the wetting component by adding further amounts of solvents. Best results were obtained by the use of a conventional silicone oil as the same is for instance marketed as "Silikonöl AK Λ00.000" by Wacker-Chemie G.m.b.H. in Munich. When using silicone oil as an additive the integral compacted surface layer on the foam material has a particularly pleasing and smooth appearance similar to that of polished leather.

It is in most cases desirable to obtain the integral cross-linked layer of non-foamed material in a thickness of an order of magnitude of at least 0.05 and preferably 0.2 of a millimeter and the products obtained in accord with the herein discussed examples have these integral layers to the extent of at least about 0.2 mm.

What is claimed is:

1. A process of producing a polyurethane article having a substantially foam form core portion and a cross-linked and substantially non-foam form thick surface which comprises providing a mold; coating the interior surfaces of said mold with an organo-tin catalyst for said polyurethane; introducing into said mold polyurethane foam-forming materials; bringing said materials to foam-forming conditions, whereby expanding said polyurethane foam-forming mass and whereby, when said mass contacts said mold internal surfaces, cross-linking that portion of said mass in contact with said surfaces and rendering such substantially non-foam form.

2. Process as claimed in claim 1, wherein said mold interior surface comprises said organo-tin catalyst coated on a member selected from the group consisting of silicones, polyesters, and metal.

3. Process as claimed in claim 2, wherein said organotin catalyst is selected from the group consisting of tin ethylhexylate, tin isooctate, tin ricinoleate, tin naphthenate, di-n-butyl tin-dilaurate.

4. Process as claimed in claim 1, wherein said foam-forming material contains about 5 percent water.

References Cited
UNITED STATES PATENTS

| | | | |
|---|---|---|---|
| 2,801,150 | 7/1957 | Koryta | 264—338 |
| 3,182,104 | 4/1965 | Cwik | 264—45 |
| 3,251,909 | 4/1966 | Pickands et al. | 264—338 |

OTHER REFERENCES

Buist, J.: Rigid Urethane Foams: New Techniques, Materials, and Recipes, Rubber and Plastics Weekly, Feb. 2, 1963, pp. 134–137 relied on.

JULIUS FROME, Primary Examiner

L. GARRETT, Assistant Examiner

U.S. Cl. X.R.

117—5.1; 264—54